Jan. 13, 1959     E. E. ROBINSON     2,869,067
PROTECTIVE APPARATUS FOR ELECTRIC CURRENT DISTRIBUTING SYSTEMS
Filed March 8, 1957     2 Sheets-Sheet 1

Inventor
E. E. Robinson
By Glascock Downing Seebold
Attys

Inventor
E. E. Robinson

United States Patent Office 2,869,067
Patented Jan. 13, 1959

2,869,067
PROTECTIVE APPARATUS FOR ELECTRIC CURRENT DISTRIBUTING SYSTEMS

Eric Ernest Robinson, North Wembley, England, assignor to Rotax Limited, London, England Application March 8, 1957, Serial No. 644,936

Claims priority, application Great Britain March 13, 1956

4 Claims. (Cl. 322—36)

This invention has for its object to provide in a convenient form a protective apparatus for interrupting the supply of electric current to a distributing system in the event of faults occurring in the system.

An apparatus in accordance with the invention comprises the combination of a pair of transductors connected together in series, means responsive to current supplied by the transductors for controlling the field current of the generator supplying the system, direct current control windings associated with the transductors for carrying a reference current, and other control windings associated with the transductors for carrying a direct current which is variable with a predetermined change of voltage or current in the distributing system.

Figure 1:
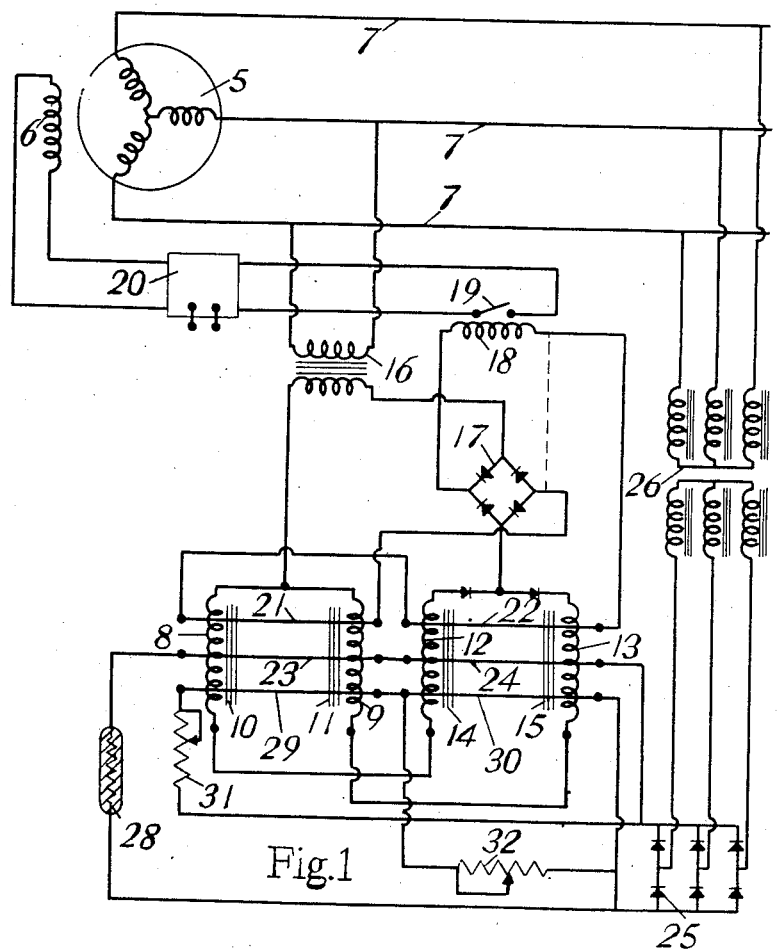
Figure 1 illustrates diagrammatically a distributing system provided with an apparatus embodying the invention.
Figure 3:
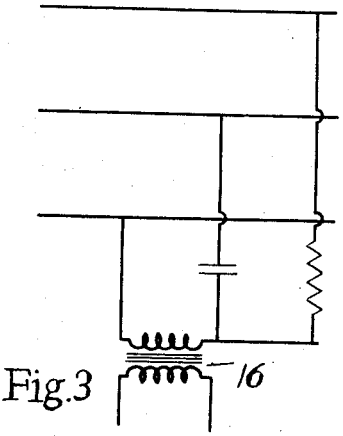

Referring to Figure 1, the system there shown includes a 3-phase alternating current generator 5, the field winding of which is represented by 6. This generator supplies current to distributing conductors 7. The apparatus in accordance with the invention for protecting the system against the effects of an adverse rise or fall of the voltage in the system includes two transductors. One of these has a pair of similar windings 8 and 9 mounted on different limbs 10 and 11 of its iron core. The other transductor likewise comprises a pair of similar windings 12 and 13 mounted on different limbs 14 and 15 of its iron core. The corresponding windings of the two transductors are connected together in series as shown. The transductors are energised from the distributing system through a single-phase voltage transformer 16, the primary winding of which is connected to the system as shown in Figure 1. Alternatively the said winding may be connected to the system through a condenser and resistance as shown in Figure 3. In either case the secondary winding is connected to the transductors through a rectifier 17. The latter is also connected to the winding 18 of an electromagnet which actuates a switch 19 which controls any convenient means indicated by 20 through which direct current is supplied from any convenient source to the field winding 6 of the generator. The said means 20 may serve to interrupt the field current, or alternatively to short circuit the field winding.

The electromagnet winding 18 may be connected at one end to one terminal of the rectifier directly as shown by the dotted line in Figure 1. Preferably it is connected as shown by full lines to opposed feed-back windings 21, 22 mounted on the transductors to ensure prompt and reliable actuation of the switch 19 when an incipient adverse condition occurs in the distributing system.

On one of the transductors is provided a control winding 23 which is connected in series with a like but oppositely acting winding 24 on the other transductor. These windings are supplied with direct current by rectifiers 25 which are connected to the secondary windings of a three-phase transformer 26, the latter being energised by current derived from the distributing system. The current supplied to the windings 23, 24 is stabilised by a barettor 28, that is, an iron wire resistance in a glass bulb containing hydrogen, the wire having a temperature coefficient such that the current passing through the wire remains constant over a wide range of voltage variations. This current is herein referred to as the reference current. The effect of the current in one of these windings is to lower the effective impedance, and that in the other is to increase the effective impedance of the associated transductor.

Also two other series connected and oppositely acting control windings 29 and 30 are mounted on the transductors, these being supplied with direct current by the rectifiers 25. The current supplied to the windings 29 and 30 is adjustable by a variable resistance 31, and that supplied to the winding 30 is also adjustable by a variable resistance 32. The purpose of the current in the windings 29 and 30 is to oppose the action of the current in the windings 23 and 24, and thereby modify the current supplied to the electromagnet 18 by the transductors.

Figure 2:
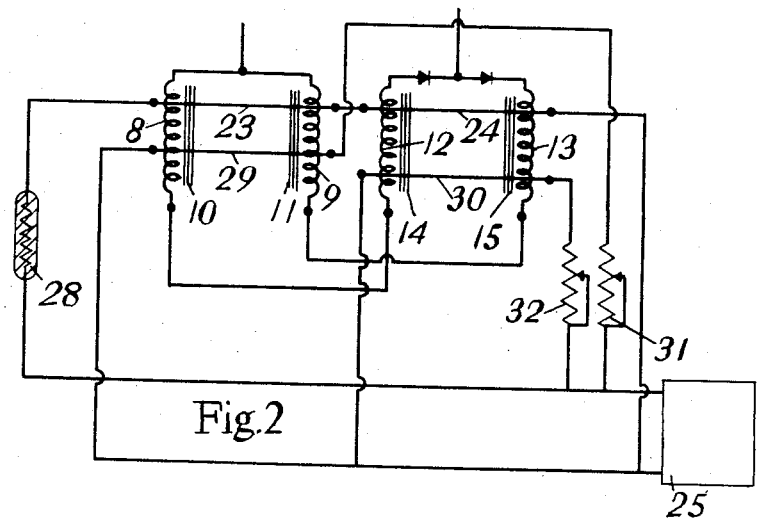
Figures 2 and 3 illustrate modification of the apparatus shown in Figure 1.

Alternatively, instead of connecting the windings 29 and 30 in series as shown in Figure 1, they may be connected in parallel as shown in Figure 2.

The arrangement is such that during normal conditions, the impedance of both transductors is low so that the current derived from the transductors is sufficient to hold the switch 19 closed. In the event of the voltage of the system rising above the normal to a predetermined amount, the effect of the increased current supplied to the control windings 29 and 30, is to cause an increase of the effective impedance of one of the transductors, with the result that insufficient current then passes to the electromagnet 18. The switch 19 then opens and so causes interruption of the generator field current, or short-circuiting of the field winding. Likewise, if a predetermined fall of voltage occurs in the system, the effective impedance of the other transductor is effected, again causing the switch 19 to open.

When the distributing system is required to carry a direct current, an alternating current is supplied from an associated generator or from a separate source for energising the transductors, the latter then serving to control the direct current generator in response to any undesired voltage variations or other fault in the direct current system.

Further the invention may be employed in essentially the same manner as that above described in either an alternating or a direct current system for giving protection against undesired variations of current in the system.

Having thus described my invention what I claim as new and desire to secure by Letters Patent is:

1. Protective apparatus for interrupting the supply of electric current from a generator to a distributing system in the event of the voltage or current in the distributing system rising or falling above or below predetermined limits, comprising in combination a switch for controlling the field current of the generator to put the latter into and out of action dependent on conditions in the distributing system, an electromagnet arranged to actuate the switch and provided with an operating winding, and a pair of transductors interconnected in series and connected to the electromagnet winding for controlling energisation of the latter, the transductors being provided respectively with oppositely acting direct current control windings for receiving a reference current, and with additional oppositely acting direct current control windings for receiving current which is variable with voltage or current changes in the distributing system.

2. Protective apparatus according to claim 1, in which the transductors are also provided respectively with a pair of opposed feed-back windings connected in series with the electromagnet winding.

3. Protective apparatus according to claim 1, and having in a circuit containing the windings for receiving the reference current, a temperature-sensitive resistance for stabilising the reference current.

4. Protective apparatus according to claim 1, and having variable resistances for adjusting the current supplied to the additional control windings.

References Cited in the file of this patent

UNITED STATES PATENTS

| | | |
|---|---|---|
| 2,161,179 | Logan | June 6, 1939 |
| 2,635,223 | Grillo | Apr. 14, 1953 |
| 2,709,776 | Evans et al. | May 31, 1955 |

FOREIGN PATENTS

| | | |
|---|---|---|
| 739,000 | Great Britain | Oct. 26, 1955 |